(12) United States Patent
Fukumoto et al.

(10) Patent No.: US 9,137,732 B2
(45) Date of Patent: Sep. 15, 2015

(54) WIRELESS COMMUNICATION SYSTEM, BASE STATION DEVICE, AND WIRELESS COMMUNICATION ROUTE SELECTION METHOD

(75) Inventors: Shusaku Fukumoto, Osaka (JP); Shiro Sugahara, Osaka (JP); Shuichi Takehana, Osaka (JP); Hidenobu Fukumasa, Osaka (JP)

(73) Assignee: SHARP KABUSHIKI KAISHI, Osaka (JP)

( * ) Notice: Subject to any disclaimer, the term of this patent is extended or adjusted under 35 U.S.C. 154(b) by 132 days.

(21) Appl. No.: 14/000,524

(22) PCT Filed: Feb. 24, 2012

(86) PCT No.: PCT/JP2012/054564
§ 371 (c)(1),
(2), (4) Date: Aug. 20, 2013

(87) PCT Pub. No.: WO2012/115229
PCT Pub. Date: Aug. 30, 2012

(65) Prior Publication Data
US 2013/0329646 A1 Dec. 12, 2013

(30) Foreign Application Priority Data
Feb. 25, 2011 (JP) ................................ 2011-039983

(51) Int. Cl.
*H04W 40/12* (2009.01)
*H04L 5/00* (2006.01)
(Continued)

(52) U.S. Cl.
CPC ........... *H04W 40/12* (2013.01); *H04B 7/15507* (2013.01); *H04L 1/0026* (2013.01);
(Continued)

(58) Field of Classification Search
CPC ..................................... H04W 40/12
USPC ......... 370/328, 315, 329, 332, 252, 243, 341, 370/400, 418; 455/436, 13.1, 524, 445, 7
See application file for complete search history.

(56) References Cited

U.S. PATENT DOCUMENTS 8,270,374 B2 * 9/2012 Cai et al. ........................ 370/332
8,284,709 B2 * 10/2012 Youn et al. .................... 370/315
(Continued)

FOREIGN PATENT DOCUMENTS

JP 2008-60951 A 3/2008
JP 2010-232945 A 10/2010

OTHER PUBLICATIONS

Carrier Aggregation Considerations for Relays,2009,3GPP TSG RAN1#56bis, R1-091332 Seoul, Korea, Motorola.*
(Continued)

*Primary Examiner* — Asad Nawaz
*Assistant Examiner* — Parth Patel
(74) *Attorney, Agent, or Firm* — Birch, Stewart, Kolasch & Birch, LLP (57) ABSTRACT

A base station device includes: an information collection unit configured to collect information for calculating evaluation values for each of first, second, and third transmission paths; an evaluation value calculation unit configured to calculate the evaluation values for each of the first, second, and third transmission paths, based on the collected information; and a transmission path selection unit configured to select, using the evaluation values of each of the first, second, and third transmission paths, a transmission path to be used by a mobile communication terminal.

7 Claims, 4 Drawing Sheets

(51) Int. Cl.
  *H04L 1/00* (2006.01)
  *H04B 7/155* (2006.01)
  *H04W 40/24* (2009.01)
  *H04W 88/08* (2009.01)

(52) U.S. Cl.
  CPC .............. *H04L 5/001* (2013.01); *H04L 5/006* (2013.01); *H04L 5/0044* (2013.01); *H04W 40/24* (2013.01); *H04W 88/08* (2013.01)

(56) References Cited

U.S. PATENT DOCUMENTS

| | | | | |
|---|---|---|---|---|
| 8,320,502 | B2* | 11/2012 | Sakai et al. | 375/324 |
| 2006/0105709 | A1* | 5/2006 | Oh et al. | 455/13.1 |
| 2006/0193406 | A1* | 8/2006 | Adachi et al. | 375/341 |
| 2007/0072600 | A1* | 3/2007 | Cho et al. | 455/423 |
| 2008/0056173 | A1* | 3/2008 | Watanabe | 370/315 |
| 2008/0084856 | A1* | 4/2008 | Ramachandran | 370/342 |
| 2008/0107075 | A1* | 5/2008 | Ramachandran et al. | 370/331 |
| 2008/0108369 | A1* | 5/2008 | Visotsky et al. | 455/455 |
| 2008/0220790 | A1* | 9/2008 | Cai et al. | 455/450 |
| 2009/0016256 | A1* | 1/2009 | Kim et al. | 370/315 |
| 2009/0219854 | A1* | 9/2009 | Okuda | 370/315 |
| 2009/0252065 | A1* | 10/2009 | Zhang et al. | 370/256 |
| 2009/0285112 | A1* | 11/2009 | Lee et al. | 370/252 |
| 2009/0325568 | A1* | 12/2009 | Tabery et al. | 455/422.1 |
| 2010/0111018 | A1* | 5/2010 | Chang, II | 370/329 |
| 2010/0128622 | A1* | 5/2010 | Horiuchi et al. | 370/252 |
| 2010/0238853 | A1* | 9/2010 | Zhou et al. | 370/315 |
| 2010/0238908 | A1* | 9/2010 | Wu | 370/336 |
| 2010/0246465 | A1* | 9/2010 | Cai et al. | 370/311 |
| 2010/0265870 | A1* | 10/2010 | Cai et al. | 370/312 |
| 2010/0304665 | A1* | 12/2010 | Higuchi | 455/7 |
| 2011/0038436 | A1* | 2/2011 | Kim et al. | 375/260 |
| 2011/0075651 | A1* | 3/2011 | Jia et al. | 370/344 |
| 2011/0136484 | A1* | 6/2011 | Braun et al. | 455/422.1 |
| 2011/0176477 | A1* | 7/2011 | Lee et al. | 370/315 |
| 2011/0286411 | A1* | 11/2011 | Kim et al. | 370/329 |
| 2012/0069793 | A1* | 3/2012 | Chung et al. | 370/315 |
| 2012/0087257 | A1* | 4/2012 | Larsson et al. | 370/252 |
| 2012/0087396 | A1* | 4/2012 | Nimbalker et al. | 375/219 |
| 2012/0093082 | A1* | 4/2012 | Kim et al. | 370/328 |
| 2012/0106404 | A1* | 5/2012 | Damnjanovic | 370/279 |
| 2012/0147831 | A1* | 6/2012 | Golitschek | 370/329 |
| 2012/0176958 | A1* | 7/2012 | Queseth et al. | 370/315 |
| 2012/0196528 | A1* | 8/2012 | Kazmi et al. | 455/9 |
| 2012/0201191 | A1* | 8/2012 | Seo et al. | 370/315 |
| 2012/0230239 | A1* | 9/2012 | Park et al. | 370/311 |
| 2012/0270555 | A1* | 10/2012 | Wei | 455/450 |
| 2012/0307928 | A1* | 12/2012 | Jia et al. | 375/267 |
| 2012/0320818 | A1* | 12/2012 | Yang et al. | 370/315 |
| 2013/0010684 | A1* | 1/2013 | Park et al. | 370/315 |
| 2013/0039289 | A1* | 2/2013 | Lee et al. | 370/329 |
| 2013/0153298 | A1* | 6/2013 | Pietraski et al. | 175/45 |
| 2013/0176981 | A1* | 7/2013 | Earnshaw et al. | 370/329 |
| 2013/0188552 | A1* | 7/2013 | Kazmi et al. | 370/315 |
| 2013/0195071 | A1* | 8/2013 | Ohta et al. | 370/330 |
| 2013/0244683 | A1* | 9/2013 | Fukumasa et al. | 455/452.2 |
| 2013/0273838 | A1* | 10/2013 | Nagata et al. | 455/9 |
| 2013/0329692 | A1* | 12/2013 | Vrzic et al. | 370/329 |
| 2013/0336282 | A1* | 12/2013 | Nakano et al. | 370/330 |
| 2013/0337811 | A1* | 12/2013 | Faerber et al. | 455/436 |

OTHER PUBLICATIONS

Discussion on the combination of Relay and CA,2010,3GPP TSG RAN WG2 meeting #69 ,R2-101094,San Francisco, USA, CATT.*
Carrier Aggregation Considerations for Relays,2009,3GPP TSG RAN1#57,R1-092168 San Francisco, USA, Motorola.*
3GPP TR36.814 V0.4.1(Feb. 2009), 3rd Generation Partnership Project; Technical Specification Group Radio Access Network; Further Advancements for E-UTRA Physical Layer Aspects (Release 9).
Motorola, "Carrier Aggregation Considerations for Relays," [online], 3GPP TSG RAN1 #56bis R1-091332, Mar. 23, 2009, [retrieved on Mar. 7, 2012]; Retrieved from the Internet: <URL: http://www.3gpp.org/ftp/tsg_ran/WG1_RL1/TSGR1-56b/Docs/ R1-091332.zip>.

* cited by examiner

WIRELESS COMMUNICATION SYSTEM, BASE STATION DEVICE, AND WIRELESS COMMUNICATION ROUTE SELECTION METHOD

TECHNICAL FIELD

The present invention relates to a wireless communication system, a base station device, and a wireless communication route selection method.

The subject application claims priority based on the patent application No. 2011-039983 filed in Japan on Feb. 25, 2011 and incorporates by reference herein the content thereof.

BACKGROUND ART

In recent years, in wireless communication systems, compared with former communication systems with only telephone applications, higher wireless quality is demanded, and the transmitted power of a mobile station terminal is limited by such factors as the power supply capacity. It is therefore difficult to expand the wireless area covered by one wireless base station. Given this, a relay communication system in which a relay station is disposed at a far edge of the communication service area or in an area having poor radio signal coverage is used, with the object of expanding the communication service area and improving communication quality (for example, Patent Reference 1). In this relay communication system, relay communication is performed between a wireless base station and a mobile station terminal station, via a relay station.

In a wireless communication system between a base station and a mobile communication terminal (hereinafter referred to as "mobile station") via a relay station, when judging whether communication is to be done by a transmission path between a mobile station and a base station or is to be done via a relay station, the following system has been known, in which evaluation values of each path are calculated from the information of the frequency band and transmission time to be used, the propagation loss value, the propagation loss variation width, the relative movement velocity, and the transmitted power value, and the path is calculated based on the evaluation values (refer, for example, to Patent Reference 2).

In LTE-A (Long Term Evolution-Advanced; Non-Patent Reference 1), a technique is under investigation in which transmission and reception are performed simultaneously, using a plurality of carriers (called component carriers) that are either continuous or discontinuous in frequency, thereby implementing communication that is both high-speed and high-capacity. In a base station device conforming to LTE-A, in order to maintain compatibility with 3.9-generation (LTE: Long Term Evolution) wireless communication systems, investigation is underway with regard to the division of a plurality of frequency band to be used in LTE-A into component carriers (for example, 20 MHz) for each frequency band of an older-generation wireless communication system. Investigation is also underway with regard to communicating using one of the component carriers to communicate with older-generation mobile stations and using the component carriers over a plurality of frequency bands to communicate with LTE-A mobile station devices, these being used simultaneously to communicate.

PRIOR ART DOCUMENTS

Patent References

[Patent Reference 1] Japanese Unexamined Patent Application, First Publication No. 2008-60951
[Patent Reference 2] Japanese Unexamined Patent Application, First Publication No. 2010-232945

Non-Patent Reference

[Non-Patent Reference 1] 3GPP TR36.814 V0.4.1 (2009-02), 3rd Generation Partnership Project; Technical Specification Group Radio Access Network; Further Advancements for E-UTRA Physical Layer Aspects (Release 9)

SUMMARY OF THE INVENTION

Problem to Be Solved by the Invention

In the wireless communication system described in Patent Reference 2, although it is possible to calculate evaluation values of transmission paths to select an optimum transmission path, this is predicated on transmission paths to be compared that have already been detected. Patent Reference 2 refers to a method of selected an optimum transmission path from among transmission paths that have been detected, but does not refer to how the transmission paths to be evaluated are detected, what signal is to be evaluated, by what means the signal to be evaluated is transmitted, or is made to be transmitted, and the parameters for evaluation value calculation upon transmission thereof. Thus, there is no clear indication of how the parameters (for example, transmission path loss and received power) required for the calculation of evaluation values are to be calculated. Additionally, there is no consideration given to carrier aggregation (CA; a technique of grouping a plurality of LTE-compatible frequency blocks of up to 20 MHz) using the relay station.

The present invention has been made in consideration of the above-noted situation, and has as an object to provide a wireless communication system, a base station device, and a wireless communication route selection method enabling route selection based on evaluation values of each path that includes paths via a relation station device in the case of communicating by carrier aggregation between a base station device and a plurality of mobile station terminals.

Means to Solve the Problem (1) A first aspect of the present invention is a wireless communication system including a base station device, a mobile communication terminal, and a relay station device relaying data transmission between the base station device and the mobile communication terminal, wherein, of a first transmission path performing wireless communication between the base station device and the mobile communication terminal using a first carrier that is a component carrier, a second transmission path performing wireless communication between the base station device and the mobile communication terminal using a second carrier that is a component carrier having a frequency different from that of the first carrier, and a third transmission path that, by performing wireless communication between the base station device and the relay station device using the first carrier and also by performing wireless communication between the relay station device and the mobile communication terminal using the third carrier, performs wireless communication, going through the relay station device, between the base station device and the mobile communication terminal, at least two of the first, second and third transmission paths can be used, and wherein the base station device includes: an information collection unit configured to collect information for calculating evaluation values for each of the first, second, and third transmission paths; an evaluation value calculation unit configured to calculate the evaluation values for each of the first, second, and third transmission paths, based on the collected information; and a transmission path selection unit configured to select, using the evaluation values of each of the first, second, and third transmission paths, a transmission path to be used by the mobile communication terminal.

(2) In the first aspect of the present invention, the base station device, to collect the information, may request the relay station device to transmit a reference signal using a component carrier that will be a candidate for carrier aggregation, and request the mobile communication terminal that will perform carrier aggregation to measure the reference signal transmitted by the base station device and a plurality of neighboring relay station devices, and wherein the mobile communication terminal may report to the base station device information of measurement results measured in response to the reference signal measurement request.

(3) In the first aspect of the present invention, the base station device, to collect the information, may request the mobile communication terminal to use a component carrier that will be a candidate for carrier aggregation to transmit a reference signal and requests the relay station device that will perform carrier aggregation to measure the reference signal transmitted by the neighboring mobile communication terminal, and wherein the relay station device may report to the base station device information of measurement results measured in response to the reference signal measurement request.

(4) A second aspect of the present invention is a base station device performing wireless communication with a mobile communication terminal and a relay station device, wherein, of a first transmission path performing wireless communication between the base station device and the mobile communication terminal using a first carrier that is a component carrier, a second transmission path performing wireless communication between the base station device and the mobile communication terminal using a second carrier that is a component carrier having a frequency different from that of the first carrier, and a third transmission path that, by performing wireless communication between the base station device and the relay station device using the first carrier and also by performing wireless communication between the relay station device and the mobile communication terminal using the third carrier, performs wireless communication, going through the relay station device, between the base station device and the mobile communication terminal, at least two of the first, second and third transmission paths can be used, the base station device including: an information collection unit configured to collect information for calculating evaluation values for each of the first, second, and third transmission paths; an evaluation value calculation unit configured to calculate the evaluation values for each of the first, second, and third transmission paths, based on the collected information; and a transmission path selection unit configured to select, using the evaluation values of each of the first, second, and third transmission paths, a transmission path to be used by the mobile communication terminal.

(5) A third aspect of the present invention is a wireless communication route selection method in a wireless communication system including a base station device, a mobile communication terminal, and a relay station device relaying data transmission between the base station device and the mobile communication terminal, wherein, of a first transmission path performing wireless communication between the base station device and the mobile communication terminal using a first carrier that is a component carrier, a second transmission path performing wireless communication between the base station device and the mobile communication terminal using a second carrier that is a component carrier having a frequency different from that of the first carrier, and a third transmission path that, by performing wireless communication between the base station device and the relay station device using the first carrier and also by performing wireless communication between the relay station device and the mobile communication terminal using the third carrier, performs wireless communication, going through the relay station device, between the base station device and the mobile communication terminal, at least two of the first, second and third transmission paths can be used, and wherein the base station device performs: collecting information for calculating evaluation values for each of the first, second, and third transmission paths, calculating the evaluation values for each of the first, second, and third transmission paths based on the collected information, and using the evaluation values of each of the first, second, and third transmission paths to select a transmission path to be used by the mobile communication terminal.

(6) In the third aspect of the present invention, the base station device, to collect the information, may request the relay station device to transmit a reference signal using a component carrier that will be a candidate for carrier aggregation, and request the mobile communication terminal that will perform carrier aggregation to measure the reference signal transmitted by the base station device and a plurality of neighboring relay station devices, and wherein the mobile communication terminal may report to the base station device information of measurement results measured in response to the reference signal measurement request.

(7) In the third aspect of the present invention, the base station device, to collect the information, may request the mobile communication terminal to use a component carrier that will be a candidate for carrier aggregation to transmit a reference signal and requests the relay station device that will perform carrier aggregation to measure the reference signal transmitted by the neighboring mobile communication terminal, and wherein the relay station device may report to the base station device information of measurement results measured in response to the reference signal measurement request.

Effect of the Invention

According to the present invention, evaluation values of a transmission path via a relay station device are calculated, achieving the effect of enabling wireless communication to which carrier aggregation is applied, by optimum path selection that includes a transmission path via a relay station device.

EMBODIMENT FOR CARRYING OUT THE INVENTION

Figure 1:
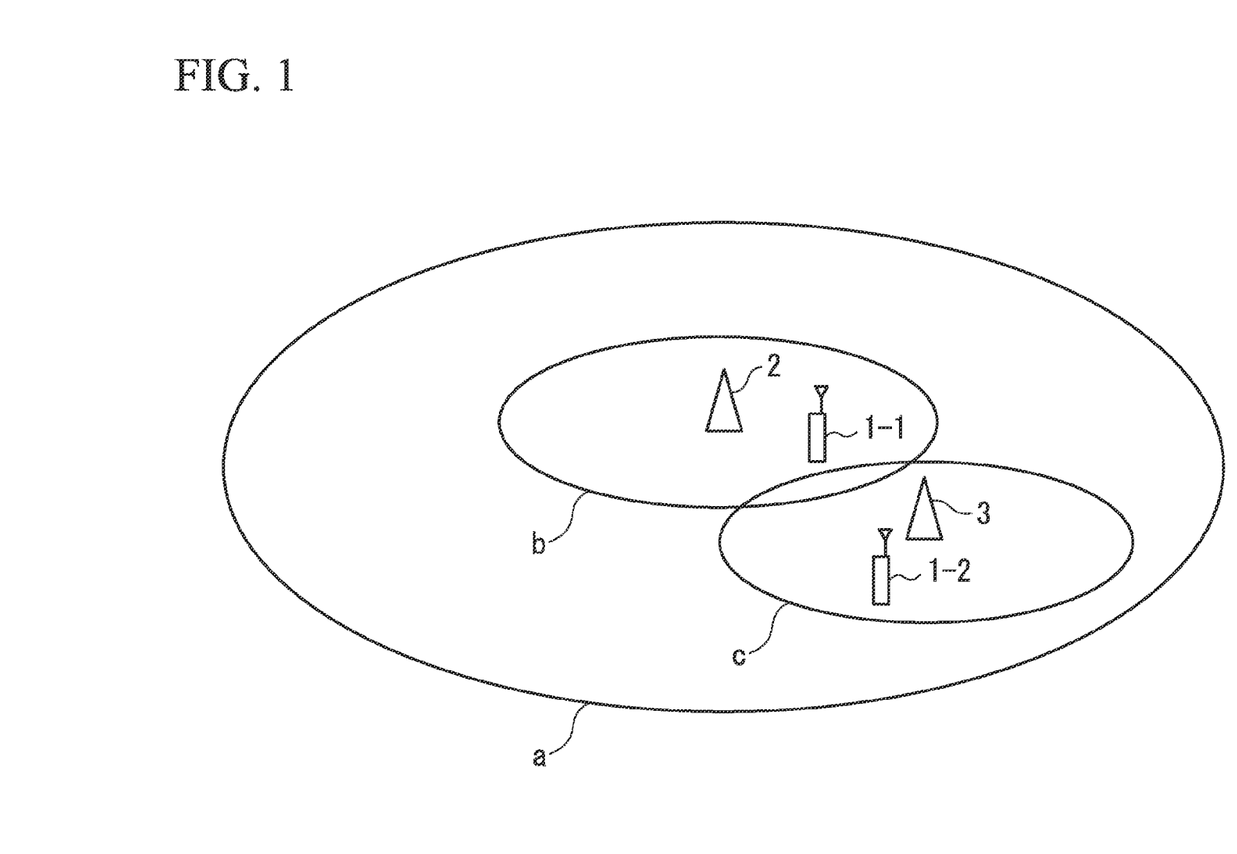
FIG. 1 is a conceptual drawing of a wireless communication system according to an embodiment of the present invention.

A wireless communication system according to an embodiment of the present invention will be described below, with references being made to the drawings. FIG. 1 is a conceptual drawing of the wireless communication system according to the present embodiment. The wireless communication system in the present embodiment is constituted by mobile communication terminals (hereinafter referred to as mobile stations) 1-1 and 1-2, a base station device (hereinafter referred to as a base station) 2, and a relay station device (hereinafter referred to as a relay station) 3. The elliptical area shown by the solid lines in FIG. 1 indicates the approximate cell area. The base station 2 operates a cell a by a first carrier and operates a cell b by a second carrier. For example, the first carrier is a component carrier in the 800-MHz band, and the second carrier is a component carrier in the 2-GHz band. The first carrier is used also as a backhaul link (a link between a base station and a relay station) between the base station 2 and the relay station 3. The relay station 3 uses the third carrier as an access link between the relay station 3 and a mobile station and operates a cell c. In this case, the mobile station 1-1 exists within the cell b and the mobile station 1-2 exists within the cell c.

Because the third carrier transmitted power of the relay station 3 and the second carrier transmitted power of the base station 2 are smaller than the first carrier transmitted power of the base station 2, the cell b and the cell c are smaller areas than the cell a. Under these conditions, the second carrier and the third carrier may be the same frequency or different frequencies.

The base station 2 has a function that controls the transmission route selection for communication that includes a plurality of relay stations 3 within the area of a base station. FIG. 1 shows a wireless communication system in which, whereas there is one base station, there is one relay station and two mobile stations. However, in reality, a wireless communication system is constituted in which, with respect to one base station, there is a plurality of relay stations 3 and three or more mobile stations 1-*n*.

In this case, when the mobile station 1-1 shown in FIG. 1 is within the service area of the cell a, it waits using the first carrier, and when it makes or receives a call, it uses the first carrier to connect to the base station 2.

After the mobile station 1-1 makes a connection to the base station 2 by the first carrier, when two component carriers are used for carrier aggregation communication, if the base station 2 had turned off the second carrier, the base station 2 transmits the second carrier and forms the cell b. Additionally, if the relay station 3 has turned off the access link (downlink), the base station 2 requests the relay station 3 to transmit the access link. In response to that request, the relay station 3 begins transmission of the access link and forms the cell c.

When this occurs, the following transmission paths 1 to 3 can be taken as carrier aggregation transmission path candidates between the base station 2 and the mobile station 1-1.
Transmission path 1: Base station 2 - - - Mobile station 1-1 (using the first carrier)
Transmission path 2: Base station 2 - - - Mobile station 1-1 (using the second carrier)
Transmission path 3: Base station 2 - - - Relay station 3 - - - Mobile station 1-1

After the mobile station 1-2 connects to the base station 2 by the first carrier, when communicating by carrier aggregation using two component carriers, the following transmission paths 4 to 6 can be taken as carrier aggregation transmission path candidates between the base station 2 and the mobile station 1-2.
Transmission path 4: Base station 2 - - - Mobile station 1-2 (using the first carrier)

Transmission path 5: Base station 2 - - - Mobile station 1-2 (using the second carrier)
Transmission path 6: Base station 2 - - - Relay station 3 - - - Mobile station 1-2

The transmission path selection method shown in Patent Reference 2 is applied to the carrier aggregation transmission path (component carrier) selection, by calculating and comparing the evaluation values of transmission paths 1 to 3 ($E_{path1}$, $E_{path2}$, and $E_{path3}$) with regard to the mobile station 1-1, two optimum transmission paths are selected and determined. When this is done, if the evaluation values of the transmission paths 1 to 3 with regard to the mobile station 1-1 are such that $E_{path1} \leq E_{path2}$ $E_{path3}$ (where the smaller is the evaluation value E, the higher is the transmission quality of the transmission path), the optimum transmission paths 1 and 2 can be selected as the carrier aggregation transmission paths with regard to the mobile station 1-1.

Also, by calculating and comparing the evaluation value of the transmission paths 4 to 6 ($E_{path4}$, $E_{path5}$, and $E_{path6}$, with regard to the mobile station 1-2, two optimum 1 transmission paths are selected and determined. When this is done, if the evaluation values of the transmission paths 4 to 5 with regard to the mobile station 1-2 are such that $E_{path6} \leq E_{path4} \leq E_{path5}$ (where the smaller is the evaluation value E, the higher is the transmission quality of the transmission path), the optimum transmission paths 4 and 6 can be selected as the carrier aggregation transmission paths with regard to the mobile station 1-2.

If the second carrier and the third carrier use the same frequency, the first carrier in the cell in which the mobile station is located is taken as the first carrier and, with regard to the mobile station 1-1 for selection of the second carrier, by calculating and comparing the evaluation values of the transmission path 2 and the transmission path 3, the optimum transmission path can be selected and determined. Even if the second carrier and the third carrier are not the same frequency, if the first carrier in the cell in which the mobile station is located is certain to be used as a carrier aggregation transmission path, a comparison of the evaluation values of the transmission path 2 and the transmission path 3 can be done to select the transmission path in the same manner.

When this is done, if the evaluation values of the transmission path 2 and the transmission path 3 with regard to the mobile station 1-1 are such that $E_{path2} \leq E_{path3}$ (where the smaller the evaluation value E is, the higher is the transmission quality of the transmission path), the optimum transmission path 1 and transmission path 2 can be selected as the carrier aggregation transmission paths with regard to the mobile station 1-1. In the same manner, if the evaluation values of the transmission path 5 and the transmission path 6 with regard to the mobile station 1-2 are such that $E_{path6} \leq E_{path5}$ (where the smaller is the evaluation value E, the higher is the transmission quality of the transmission path), the optimum transmission path 4 and the transmission path 6 can be selected as the carrier aggregation transmission paths with regard to the mobile station 1-2.

The foregoing has been a description of the case of one relay station 3 with respect to the base station 2. However, when there are a plurality of relay stations 3, evaluation values for transmission paths regarding base station to relay station to mobile station can be calculated, and these values can be compared to select an optimal carrier aggregation transmission path.

Next, detailed constitution of the mobile station 1-1, the base station 2, and the relay station 3 shown in FIG. 1 will be described, with references being made to FIG. 2. The description of the constitution of the mobile station 2-1, being the same as the constitution of the mobile station 1-1, will be omitted. The mobile station 1-1 is used in a wireless communication system. Because the mobile station 1-1 and the mobile station 1-2 shown in FIG. 1 have the same constitution, at this point the description will be of the constitution of the mobile station 1-1. The base station 2 has a communication service area and establishes a transmission path between the mobile stations 1-1 and 1-2. The relay station 3 is disposed at a far edge of the communication service area of the base station 2 or at an area of poor radio signal coverage, and as a specific communication service area for the purpose of, for example, expanding or improving the communication quality of the communication service area of the base station 2. When performing wireless communication between the mobile stations 1-1 and 1-2, and the base station 2, by relaying through the relay station 3, it is possible to expand or improve the communication quality in the communication service area of the base station 2.

Next, the constitution of the mobile station 1-1 shown in FIG. 1 will be described. The mobile station 1-1 has a wireless unit 11, a transmitting unit 12, a receiving unit 13, a control unit 14, an application unit 15, and a measurement unit 16. The wireless unit 11 converts a wireless signal received by an antenna for transmitting and receiving wireless signals to a baseband signal, and converts a baseband signal to be transmitted to a wireless signal. The transmitting unit 12 performs encoding processing and modulation processing with respect to transmitted data and generates a baseband signal. The receiving unit 13 performs decoding processing and demodulation processing with respect to a received signal converted to a baseband signal by the wireless unit 11. The control unit 14 performs overall control of the processing operations of the mobile stations 1-1 and 1-2. The application unit 15 performs application processing such as voice calling and packet communication service, and user interface processing. The measurement unit 16 measures transmitted and received signals in the wireless unit 11 for the purpose of determining evaluation values of communication quality.

Next, the constitution of the base station 2 shown in FIG. 1 will be described. The base station 2 has a wireless unit 21, a transmitting unit 22, a receiving unit 23, a control unit 24, a network communication unit 25, a measurement unit 26, and a path selection unit 27. The wireless unit 21 down-converts wireless signals transmitted and received between the mobile station 1-1 and 1-2 or the relay station 3 to baseband signals, and up-converts baseband signals to wireless signals via the antenna. The transmitting unit 22 generates and modulates data to be transmitted to the mobile stations 1-1 and 1-2 or the relay station 3. The receiving unit 23 receives and demodulates data transmitted from the mobile stations 1-1 and 1-2 or the relay station 3. The control unit 24 performs overall control of the processing operations of the base station 2. The network communication unit 25 communicates with the core network. The measurement unit 26 measures transmitted and received signal in the wireless unit 21 for the purpose of determining evaluation values of communication quality. The path selection unit 27, based on the evaluation values E for each transmission path calculated using the measured values measured by the measurement unit 26, selects and decides a transmission path between the mobile stations 1-1 and 1-2 and the base station 2.

Next, the constitution of the relay station 3 shown in FIG. 1 will be described. The relay station 3 has a wireless unit 31, a transmitting unit 32, a receiving unit 33, a control unit 34, and a measurement unit 35. The wireless unit 31 down-converts wireless signals transmitted and received between the mobile stations 1-1 and 1-2 and the base station 2 via the antenna, and up-converts baseband signals to wireless signals. The transmitting unit 32 generates and modulates data to be transmitted for the purpose of relaying. The receiving unit 33 demodulates data received for relaying. The control unit 34 performs overall control of the processing operations of the relay station 3 and, of the data received by the receiving unit 33, transmits data to be relayed, via the transmitting unit 32.

Figure 2:
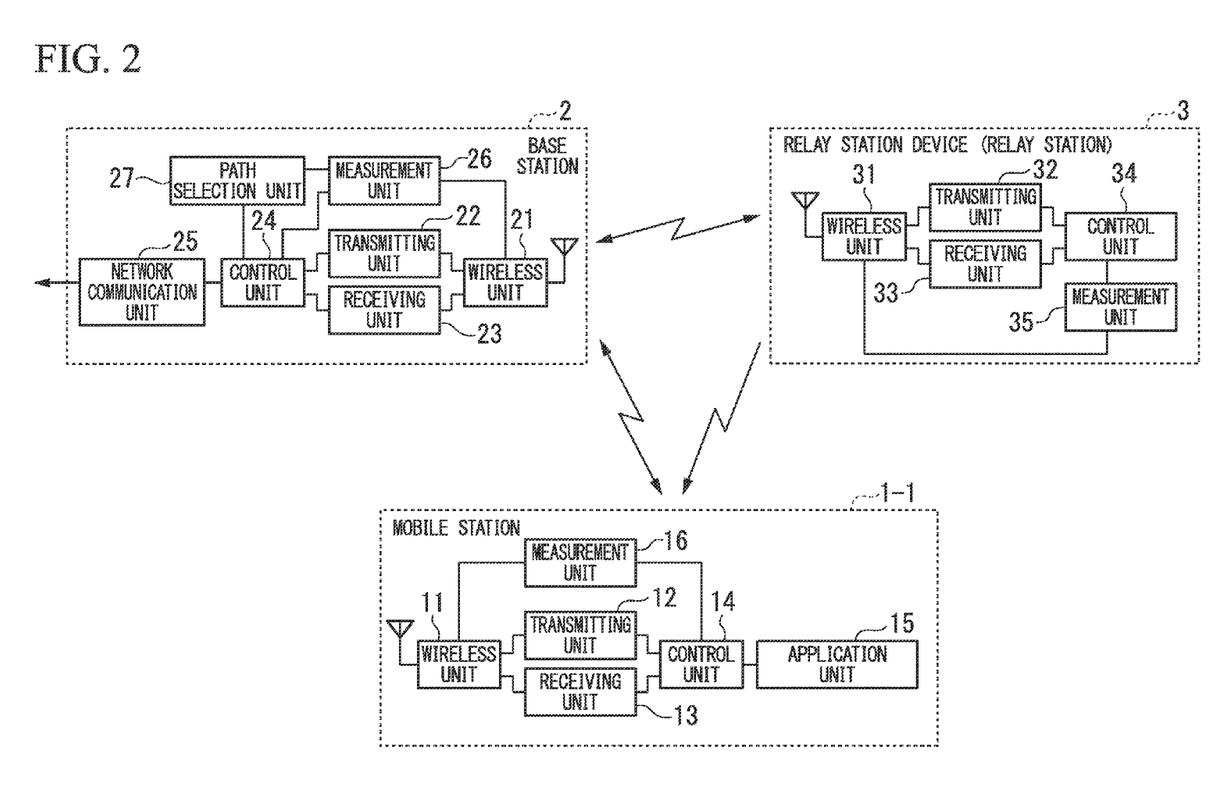
FIG. 2 is a block diagram of the constitution of a mobile station, a base station, and a relay station according to the embodiment.

When describing the constitutions of the mobile stations 1-1 and 1-2, the base station 2, and the relay station 3 referring to FIG. 2, the descriptions and illustrations of constituent elements of publicly known functions and constituent elements that mobile stations, base stations, and relay stations usually have, since they are not directly related to the description of the present embodiment, have been omitted.

Next, the processing operation for carrier aggregation transmission path selection by the mobile stations 1-1 and 1-2, the base station 2, and the relay station 3 shown in FIG. 1 and FIG. 2 will be described. First, referring to FIG. 3, the operation of the base station 2 and the mobile station 1-1 communicating without going through the relay station 3 will be described. In this case, the description will be of the case in which the mobile station 1-1 is within the service area of the cell a (first carrier) of the base station. After either the call-making procedure by the mobile station 1-1 or the call-receiving procedure by mobile station 1-1 (steps S1 and S2), the mobile station 1-1 performs carrier aggregation of two component carriers. Specifically, at step S1, RRC connection establishment processing is performed between the mobile station 1-1 and the base station 2. At step S2, EPS connection establishment processing is performed between the mobile station 1-1 and the base station 2.

Figure 3:
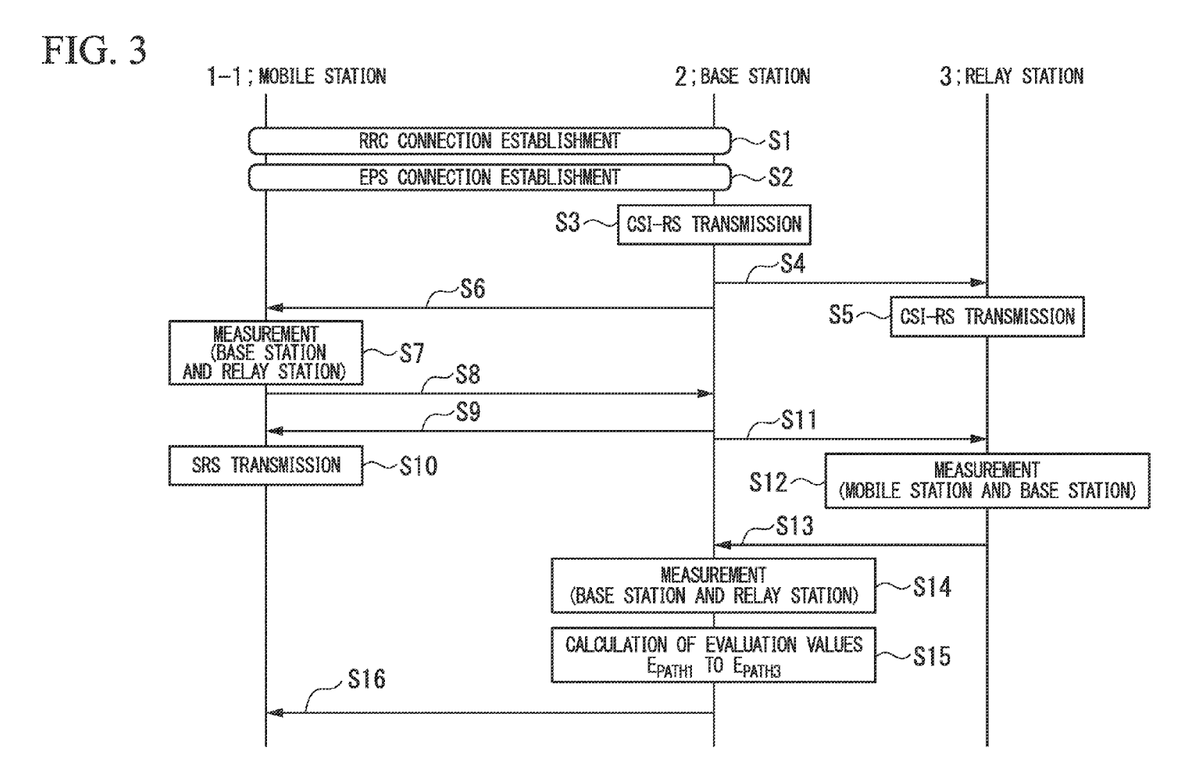
FIG. 3 is a sequence diagram showing the wireless communication route selection operation in the wireless communication system of the embodiment.

First, the control unit 24 of the base station 2 transmits, via the wireless unit 21, a CSI-RS (Channel State Information-Reference Signal: a signal transmitted to request the downlink channel state) using a first carrier and a second carrier (step S3). Then, the control unit 24 of the base station 2 transmits, via the transmitting unit 22 and the wireless unit 21, to the relay station 3 a request signal requesting transmission of the CSI-RS (step S4). The control unit 34 receives this request signal via the wireless unit 31 and the receiving unit 33 of the relay station 3. Upon receiving the request signal, the control unit 34 of the relay station 3, in accordance with the CSI-RS transmission request signal, transmits the CSI-RS signal, using a third carrier (step S5).

Next, the control unit 24 of the base station 2 transmits to the mobile station 1-1, via the transmitting unit 22 and the wireless unit 21, a request signal requesting measurement of the CSI-RS signal (step S6). The control unit 14 receives this request signal via the wireless unit 11 and the receiving unit 13 of the mobile station 1-1. Upon receiving the CSI-RS measurement request signal, the control unit 14 of the mobile station 1-1 instructs the measurement unit 16 to measure the CSI-RS signal. The measurement unit 16 measures the CSI-RS signal of the neighboring cell that includes the cell of the current mobile station position received by the wireless unit 11, and outputs information of the signal measurement result to the control unit 14 (step S7). The control unit 14 transmits to the base station 2 the information of the CSI-RS signal measurement result output from the measurement unit 16, via the transmitting unit 12 and the wireless unit 11 (step S8). By doing this, the results of measuring the CSI-RS signal on the first to third carriers are reported to the base station 2.

Next, the control unit 24 of the base station 2 transmits to the mobile station 1-1, via the transmitting unit 22 and the wireless unit 21, a request signal requesting the transmission of an SRS (Sounding Reference Signal: a signal transmitted to request determination of the uplink CQI (Channel Quality Indication: indicator of the quality for each frequency channel)) (step S9). The control unit 14 receives this request signal via the wireless unit 11 and the receiving unit 13. Upon receiving the SRS transmission request signal, the control unit 14 transmits the SRS signal using component carriers corresponding to the first to third carriers, via the transmitting unit 12 and the wireless unit 11 (step S10). When this is done, if FDD (frequency-division duplex) whereby different frequencies are allocated to the uplink and the downlink is used, component carriers that are each paired with the first and second carriers are used. If TDD (time-division duplex) whereby the uplink and the downlink are switched between times using the same frequency is used, component carriers having the same frequency are used.

Next, the control unit 24 of the base station 2 transmits to the relay station 3, via the transmitting unit 22 and the wireless unit 21, a request signal requesting measurement of the SRS and the CSI-RS (step S11). The control unit 34 receives this request signal, via the wireless unit 31 and the receiving unit 33. Upon receiving this, the control unit 34 of the relay station 3 instructs the measurement unit 35 to measure the SRS and the CSI-RS signals. The measurement unit 35, upon receiving this instruction, measures the SRS and the CS1-RS signals received at the wireless unit 31, and outputs information of the measurement results to the control unit 34. The control unit 34 transmits to the base station 2, via the transmitting unit 32 and the wireless unit 31, information of the CSI-RS signal measurement result output from the measurement unit 35 (step S13).

Next, the control unit 24 of the base station 2 instructs the measurement unit 26 to measure the SRS from the mobile station 1-1 and the signal via the relay station 3. Upon receiving this instruction, the measurement unit 26 measures the SRS from the mobile station 1-1 received at the wireless unit 21 and the signal via the relay station 3, and outputs information of the measurement results to the control unit 24 (step S 14). Then, the control unit 24, using the information of the CSI-RS measurement result reported from the mobile station 1-1, the CSI-RS measurement result reported from the relay station 3, and the measurement result output from the measurement unit 26, calculates the evaluation values $E_{path1}$, $E_{path2}$, and $E_{path3}$ of the transmission paths 1 to 3 (step S15). Because these evaluation values E can be calculated using a publicly known method (for example, the method described in Patent Reference 2), a detailed description of the calculation method will be omitted. The control unit 24 outputs the calculated evaluation values E to the path selection unit 27.

Upon receiving the evaluation values E, the path selection unit 27 compares the calculated evaluation values $E_{path1}$ to $E_{path3}$ for the transmission paths 1 to 3. If $E_{path1} \leq E_{path2} \leq E_{path3}$, the path selection unit 27 selects and determines the transmission paths 1 and 2 as the carrier aggregation transmission paths regarding mobile station 1-1, and notifies the control unit 24 of information of the decided transmission paths. That is, the base station 2 and the mobile station 1-1 are notified to communicate by carrier aggregation of the transmission paths 1 and 2, which do not go through a relay station. Upon receiving this notification, the control unit 24 performs control so as to communicate by carrier aggregation of the transmission paths 1 and 2, without going through the relay station 3, thereby starting communication between the base station 2 and the mobile station 1-1 (step S16). For example, the base station 2 transmits traffic data or control data to the mobile station 1-1.

Next, referring to FIG. 4, the operation of the base station 2 and the mobile station 1-2 communicating via a relay station 3 will be described. In this case, the description will be for the case in which the mobile station 1-2 is within the service area of the cell a (first carrier) of the base station. After either the call-making procedure by the mobile station 1-2 or the call-receiving procedure by the mobile station 1-2 (steps S21 and S22), the mobile station 1-2 performs carrier aggregation of two component carriers. Specifically, at step S21 RRC connection establishment processing is performed between the mobile station 1-2 and the base station 2. At step S22, EPS connection establishment processing is performed between the mobile station 1-2 and the base station 2.

Figure 4:
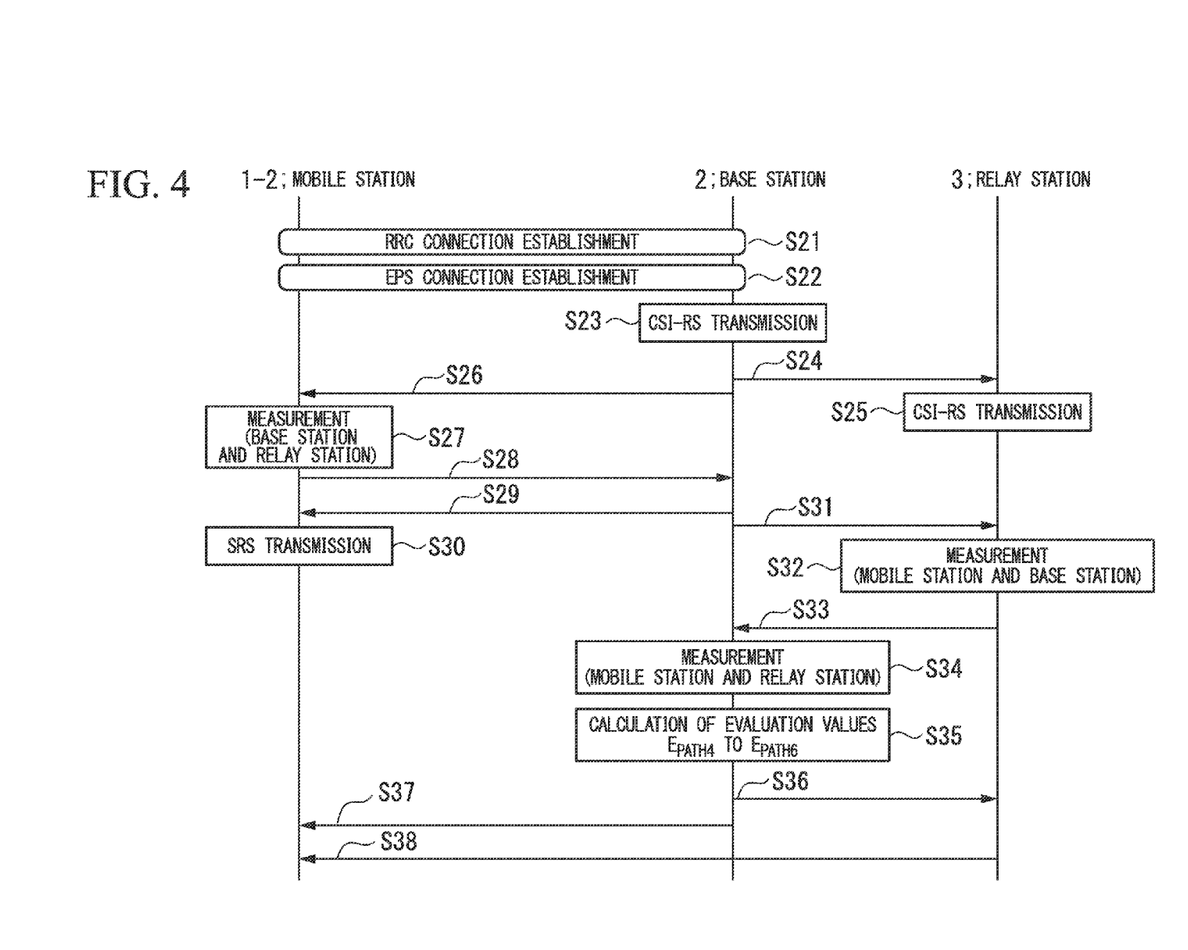
FIG. 4 is a sequence diagram showing the wireless communication route selection operation in the wireless communication system of the embodiment.

Because the processing operations of steps S23 to S34 shown in FIG. 4 are the same as the processing operations of steps S3 to S14 shown in FIG. 3, they will be described here simply.

First, the control unit 24 of the base station 2 transmits, via the transmitting unit 22 and the wireless unit 21, a CSI-RS using the first carrier and the second carrier (step S23). Then, the control unit 24 of the base station 2 transmits to the relay station 3, via the transmitting unit 22 and the wireless unit 21, a request signal requesting transmission of the CSI-RS (step S24). The control unit 34 receives this request signal via the wireless unit 31 and the receiving unit 33 of the relay station 3. Upon receiving this, the control unit 34 of the relay station 3, in accordance with the CSI-RS transmission request signal, transmits the CSI-RS signal, using the third carrier (step S25).

Next, the control unit 24 of the base station 2 transmits to the mobile station 1-2, via the transmitting unit 22 and the wireless unit 21, a request signal requesting measurement of the CS1-RS signal (step S26). The control unit 14 receives this request signal via the wireless unit 11 and the receiving unit 13 of the mobile station 1-2.

Upon receiving the CSI-RS measurement signal, the control unit 14 of the mobile station 1-2 instructs the measurement unit 16 to measure the CSI-RS signal. The measurement unit 16 measures the CSI-RS signal of the neighboring cell that includes the cell of the current mobile station position received by the wireless unit 11, and outputs information of the measurement result of this signal to the control unit 14 (step S27). The control unit 14 transmits to the base station 2 via the transmitting unit 12 and the wireless unit 11, the information of the CSI-RS signal measurement result output from the measurement unit 16 (step S28). By doing this, the results of measuring the CSI-RS signal on the first to third carriers are reported to the base station 2.

Next, the control unit 24 of the base station 2 transmits to the mobile station 1-2, via the transmitting unit 22 and the wireless unit 21, a request signal requesting the transmission of an SRS (step S29). The control unit 14 receives this request signal via the wireless unit 11 and the receiving unit 13. Upon receiving the SRS transmission request signal, the control unit 14 transmits the SRS signal using component carriers corresponding to the first to third carriers, via the transmitting unit 12 and the wireless unit 11 (step S30).

Next, the control unit 24 of the base station 2 transmits to the relay station 3, via the transmitting unit 22 and the wireless unit 21, a request signal requesting measurement of the SRS and the CSI-RS (step S31). The control unit 34 receives this request signal, via the wireless unit 31 and the receiving unit 33. Upon receiving this, the control unit 34 of the relay station 3 instructs the measurement unit 35 to measure the SRS and the CSI-RS signals. The measurement unit 35, upon receiving this instruction, measures the SRS and the CSI-RS signals received at the wireless unit 31, and outputs information of the measurement results to the control unit 34. The control unit 34 transmits to the base station 2, via the transmitting unit 32 and the wireless 31, information of the CSI-RS signal measurement result output from the measurement unit 35 (step S33).

Next, the control unit 24 of the base station 2 instructs the measurement unit 26 to measure the SRS from the mobile station 1-2 and the signal via the relay station 3. Upon receiving this instruction, the measurement unit 26 measures the SRS from the mobile station 1-1 received at the wireless unit 21 and the signal via the relay station 3, and outputs information of the measurement results to the control unit 24 (step S34). Then, the control unit 24, using the information of the CSI-RS measurement result reported from the mobile station 1-2, the CSI-RS measurement result reported from the relay station 3, and the measurement result output from the measurement unit 26, calculates the evaluation values $E_{path4}$, $E_{path5}$ and $E_{path6}$ of the transmission paths 4 to 6 (step S35). The control unit 24 outputs the calculated evaluation values E to the path selection unit 27.

Upon receiving the evaluation values E, the path selection unit 27 compares the calculated evaluation values $E_{path4}$ to $E_{path6}$ for the transmission paths 4 to 6. If $E_{path6} \leq E_{path4} \leq E_{path5}$, the path selection unit 27 selects and determines the transmission paths 4 and 6 as the carrier aggregation transmission paths regarding mobile station 1-2, and notifies the control unit 24 of information of the decided transmission paths. That is, the base station 2 and the mobile station 1-2 are notified to communicate by carrier aggregation of the transmission path 1 by the first carrier and of the transmission path 6 via the relay station 3. Upon receiving this notification, the control unit 24 performs control so as communication by carrier aggregation, using the transmission paths 4 and 6 via the relay station 3, thereby starting communication between the base station 2 and the mobile station 1-2 (steps S36 to S38). For example, the base station 2 transmits traffic data to the relay station 3 (step S36). The base station 2 transmits traffic data or control data to the mobile station 1-2 (step S37). The relay station 3 transmits traffic data to the mobile station 1-2 (step S38).

In the foregoing, in the carrier aggregation transmission path selection method that focuses on the mobile station 1-1 and the mobile station 1-2, the operation of measuring the CSI-RS at the mobile stations 1-1 and 1-2 and reporting to the base station 2 by the processing operations of steps S3 to S8 (steps S23 to 28) has been described. However, as a simplified method, steps S3 to S5 (steps S23 to S25) may be omitted, with a normal measurement request being made by the base station 2 to the mobile stations 1-1 and 1-2, a normal measurement being made at step S6 (step S26) and, at step S7 (step S27), the mobile stations 1-1 and 1-2 measuring the received power (RSRP; reference signal received power) of the RS (reference signal) on the first carrier and second carrier of the base station 2 and the second carrier of the relay station 3, and the propagation path loss of each of the transmission paths based on the transmitted power included in the notification information, and reporting to the base station 2 the RSRP or the propagation path losses.

The measurement of the propagation path loss is obtained by the ratio of the transmitted power included in the notification information transmitted from the base station 2 or the relay station 3 and the received power of the signals received at the mobile stations 1-1 and 1-2, the measurement being relatively simple, and the amount of information notified to the base station 2 being small. The CSI (Channel State Information), in contrast, is given as a channel matrix between the base station 2 and the mobile stations 1-1 and 1-2, and if the number of transmitting antennas of mobile station 2 is $N_{BS}$ and the number of receiving antennas of the mobile stations 1-1 and 1-2 is $N_{MS}$, the matrix is a complex $N_{MS} \times N_{BS}$ matrix, the amount of information thereof being large. However, to investigate the effect of multi-user MIMO (MU-MIMO) or beam-forming, CSI is necessary.

At step S15 (step S35), if only the evaluation values of the transmission paths of the downlink signal are to be determined, the processing operations of steps S9 to S14 (steps S29 to S34) may be omitted. In a TDD system, because transmission paths having the same frequency are used for both the uplink and the downlink, it is sufficient to evaluate only the downlink signal.

As described above, when communicating using carrier aggregation between a base station and a plurality of mobile stations, the transmission path can be selected based on the evaluation values of each transmission path that includes a transmission path via the relay station. Also, when communicating using carrier aggregation between a base station and a plurality of mobile stations, it is possible to implement a wireless communication system including a relay system that uses a part of the subcarriers as the backhaul link (link between the base station and the relay station), and uses another part or all of the subcarriers for communication with the mobile stations.

Wireless communication path selection processing may be done by recording a program for implementing the functionality of the measurement units 16, 26, and 35 and the path selection unit 27 shown in FIG. 2 in a computer-readable recording medium and having a computer system read in and execute the program recorded in the recording medium. The term "computer system" as used herein includes an operating system and hardware such as peripheral devices. The term "computer-readable recording medium" refers to a portable medium such as a flexible disk, an opto-magnetic disk, a ROM, or a CD-ROM, and a storage apparatus such as a hard-disk apparatus built into a computer system. Additionally, the term "computer-readable recording medium" may include one that holds a program for a certain period of time, such as a volatile memory (RAM) within the computer system that is to become a server or a client, in the case of transmitting a program via a network such as the Internet or via a communication circuit such as a telephone line.

The above-noted program may be transferred from a computer system in a recording device of which the program is stored to another computer system, via a transfer medium or by a transfer signal in a transfer medium. The term "transfer medium" which transfers a program as used herein refers to a medium having a function of transferring information, such as by a network (communication network) such as the Internet, or a communication line such a telephone line. The above-noted program may be one for implementing a part of the above-described functionality, and may be one for implementing the above-described functionality in combination with a program that has already been recorded within a computer system, this being a so-called difference file (difference program).

INDUSTRIAL APPLICABILITY

The present invention is applicable to mobile communication in which a base station selects a transmission path used in communication with mobile communication terminals, including via a relay station apparatus.

REFERENCE SYMBOLS 1-1, 1-2 Mobile communication terminal (mobile station)
11 Wireless unit
12 Transmitting unit
13 Receiving unit
14 Control unit
15 Application unit
16 Measurement unit
2 Base station device (base station)
21 Wireless unit
22 Transmitting unit
23 Receiving unit
24 Control unit
25 Network communication unit
26 Measurement unit
27 Path selection unit
3 Relay station device (relay station)
31 Wireless unit
32 Transmitting unit
33 Receiving unit
34 Control unit
35 Measurement unit
a, b, c Cell

The invention claimed is:

1. A wireless communication system comprising a base station device, a mobile communication terminal, and a relay station device, the relay station device relaying data transmission between the base station device and the mobile communication terminal, wherein
a first transmission path is used to perform a first wireless communication between the base station device and the mobile communication terminal using a first carrier that is a first component carrier,
a second transmission path is used to perform a second wireless communication between the base station device and the mobile communication terminal using a second carrier that is a second component carrier, the second carrier having a frequency different from that of the first carrier, and
a third transmission path is used to perform a third wireless communication, going through the relay station device, between the base station device and the mobile communication terminal, the third wireless communication being performed by performing a fourth wireless communication between the base station device and the relay station device using the first carrier and also by performing a fifth wireless communication between the relay station device and the mobile communication terminal using a third carrier,
wherein at least two of the first, second and third transmission paths can be used, and wherein the base station device comprises:
an information collection unit configured to collect first information for calculating evaluation values for each of the first, second, and third transmission paths;
an evaluation value calculation unit configured to calculate the evaluation values for each of the first, second, and third transmission paths, the calculation being performed based on the collected first information; and
a transmission path selection unit configured to select, using the evaluation values of each of the first, second, and third transmission paths, a fourth transmission path to be used by the mobile communication terminal.

2. The mobile communication system according to claim 1, wherein
the base station device, to collect the first information, is configured to request the relay station device to transmit a reference signal using a third component carrier that will be a candidate for carrier aggregation, and request the mobile communication terminal that will perform carrier aggregation to measure the reference signal transmitted by the base station device and a plurality of neighboring relay station devices, and wherein
the mobile communication terminal is configured to report to the base station device second information of measurement results measured in response to a measurement request of the reference signal.

3. The mobile communication system according to claim 1, wherein
the base station device, to collect the information, is configured to request the mobile communication terminal to use a third component carrier that will be a candidate for carrier aggregation to transmit a reference signal and request the relay station device that will perform carrier aggregation to measure the reference signal transmitted by a neighboring mobile communication terminal, and wherein
the relay station device is configured to report to the base station device second information of measurement results measured in response to a measurement request of the reference signal.

4. A base station device performing wireless communication with a mobile communication terminal and a relay station device, wherein
a first transmission path is used to perform a first wireless communication between the base station device and the mobile communication terminal using a first carrier that is a first component carrier,
a second transmission path is used to perform a second wireless communication between the base station device and the mobile communication terminal using a second carrier that is a second component carrier, the second carrier having a frequency different from that of the first carrier, and
a third transmission path is used to perform a third wireless communication, going through the relay station device, between the base station device and the mobile communication terminal, the third wireless communication being performed by performing a fourth wireless communication between the base station device and the relay station device using the first carrier and also by performing a fifth wireless communication between the relay station device and the mobile communication terminal using a third carrier,
wherein at least two of the first, second and third transmission paths can be used,
and wherein the base station device comprises:
an information collection unit configured to collect first information for calculating evaluation values for each of the first, second, and third transmission paths;
an evaluation value calculation unit configured to calculate the evaluation values for each of the first, second, and third transmission paths, the calculation being performed based on the collected first information; and
a transmission path selection unit configured to select, using the evaluation values of each of the first, second, and third transmission paths, a fourth transmission path to be used by the mobile communication terminal.

5. A wireless communication route selection method in a wireless communication system comprising a base station device, a mobile communication terminal, and a relay station device, the relay station device relaying data transmission between the base station device and the mobile communication terminal, wherein a first transmission path is used to perform a first wireless communication between the base station device and the mobile communication terminal using a first carrier that is a first component carrier, a second transmission path is used to perform a second wireless communication between the base station device and the mobile communication terminal using a second carrier that is a second component carrier, the second carrier having a frequency different from that of the first carrier, and a third transmission path is used to perform a third wireless communication, going through the relay station device, between the base station device and the mobile communication terminal, the third wireless communication being performed by performing a fourth wireless communication between the base station device and the relay station device using the first carrier and also by performing a fifth wireless communication between the relay station device and the mobile communication terminal using a third carrier, wherein at least two of the first, second and third transmission paths can be used, and wherein the base station device performs:

collecting first information for calculating evaluation values for each of the first, second, and third transmission paths;

calculating the evaluation values for each of the first, second, and third transmission paths, the calculation being performed based on the first collected information; and using the evaluation values of each of the first, second, and third transmission paths to select a fourth transmission path to be used by the mobile communication terminal.

6. The wireless communication route selection method according to the claim 5, wherein the base station device, to collect the first information, requests the relay station device to transmit a reference signal using a third component carrier that will be a candidate for carrier aggregation, and requests the mobile communication terminal that will perform carrier aggregation to measure the reference signal transmitted by the base station device and a plurality of neighboring relay station devices, and wherein the mobile communication terminal reports to the base station device second information of measurement results measured in response to a measurement request of the reference signal.

7. The wireless communication route selection method according to claim 5, wherein the base station device, to collect the information, requests the mobile communication terminal to use a third component carrier that will be a candidate for carrier aggregation to transmit a reference signal and requests the relay station device that will perform carrier aggregation to measure the reference signal transmitted by a neighboring mobile communication terminal, and wherein the relay station device reports to the base station device information of measurement results measured in response to a measurement request of the reference signal.

* * * * *